UNITED STATES PATENT OFFICE.

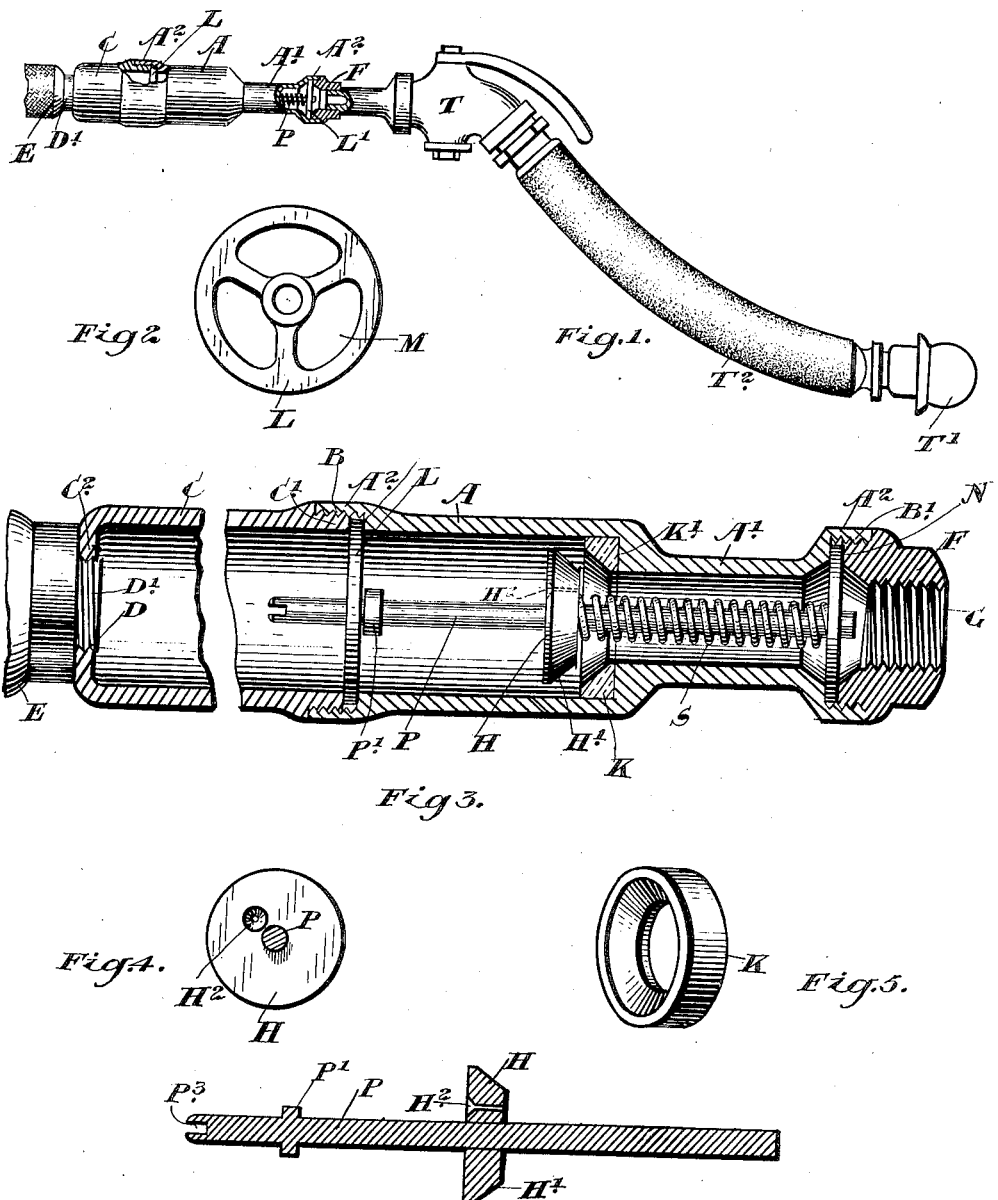

THOMAS CLEGG, OF WINNIPEG, CANADA, ASSIGNOR OF ONE-THIRD TO ALEXANDER McKINNY AND ONE-THIRD TO ROBERT ANDREW BONNAR, OF WINNIPEG, CANADA.

AUTOMATIC AIR-BRAKE CONTROLLER.

No. 821,859.  Specification of Letters Patent.  Patented May 29, 1906.

Application filed November 20, 1905. Serial No. 288,285.

*To all whom it may concern:*

Be it known that I, THOMAS CLEGG, of the city of Winnipeg, in the Province of Manitoba, Canada, have invented certain new and useful Improvements in Automatic Air-Brake Controllers, of which the following is a specification.

My invention relates to improvements in automatic air-brake controllers more especially adapted for the emergency control of the air-brakes on railway rolling-stock; and the object of the invention is to devise a simple, cheap, efficient, and reliable controller in which the air used in the manipulating of the air-brakes is automatically made to gradually apply the said brakes in event of any of the successive cars breaking coupling or any other such interfering irregularity occurring; and it consists, essentially, of a peculiarly-adapted valve, a cylindrical casing inclosing and suspending said valve, a valve-chamber continuous with the said casing, and means for connecting said casing and chamber to the train-pipes, the parts being otherwise arranged and constructed in detail, as hereinafter more particularly described.

Heretofore when any irregularity, such as hereinbefore stated, occurred the air-brakes were applied immediately and positively, with the result that the cars stopped almost dead, resulting in a loss, if not of life, in breakage; but the attachment that I provide obviates any such occurrence by bringing the car gradually to a stop, thus overcoming the serious and ever present danger involved in all rail traffic. A further benefit is derived in that when the coupling breaks the car or cars of each section are gradually brought to a standstill, thus preventing telescoping and providing at the same time means whereby in being stopped they are practically dead at the same point, minimizing to a certain degree the work of recoupling.

Figure 1 is a side view of my controller, showing an application to the train-pipe. Fig. 2 is a plan view of the spider or bearing for the valve-spindle. Fig. 3 is a detailed sectional view of the valve-casing and the valve-chamber, showing the valve and the valve mechanism supported therein. Fig. 4 is a plan view of the valve. Fig. 5 is a perspective detail view of the valve-seat. Fig. 6 is a longitudinal section of the valve and the valve-spindle.

In the drawings like letters of reference indicate corresponding parts in each figure.

A is the outer cylindrical casing, having a contracted portion A' and annular enlargements in the end portions of the said casing.

B B' are female or concave screws turned on the inner surfaces of the annular enlargements $A^2$.

C is the valve-chamber of an annular cylindrical cross-section with open and partially-closed ends C' $C^2$. The open end C' is threaded and designed to screw into the female screw B of the casing A. D is a circular opening in the end $C^2$ of the said chamber, having a female screw cut thereon and designed to receive the coupling-nut D', into which is screwed the end of the approaching train-pipe E or the like.

F is a cap-nut with an outer threading supplemental to B' and designed to screw therein, and G is an inner or female threading into which the receding portion of the continuous train-pipe E is secured.

H is the valve of a cylindrical form with a beveled periphery H', and $H^2$ a port-hole of a choke-plug shape, cut in the said valve and allowing of equalizing of pressures on the opposing faces thereof.

K is the valve-seat, mounted at the point K', wherein the contraction in the casing A occurs, and is of a circular disk shape, having the central portion cut away and designed to receive flush the valve H.

L L' are spiders forming bearings of a circular disk shape, placed in the ends of the casing A and abutting on the inner edges of their peripheries the surfaces formed by the annular enlargements $A^2$ of the casing A, being securely held therein by the end C' of the chamber C and the inner face N of the cap-nut F. M represents perforations in the said spider, allowing of the free circulation of air.

P is the valve-spindle passing into and through the central portion of the valve and extending longitudinally therefrom and supported at its extremities in the bearings or spiders L L', respectively.

p' is a shoulder on the valve-stem P, limiting its motion and preventing the valve H from being displaced too far from the valve-seat K.

S is a spiral compression-spring or the like encircling the valve-spindle P and bearing at its one extremity on the inner surface of the spider L' and at its other on the face of the valve H.

$p^3$ is a groove cut in the spindle P to facilitate in the grinding of the valve.

In applying my controller to the train it is connected to the continuous train-pipe, preferably immediate to the angle-cocks T and on the side remote from the coupling having the end containing the valve-chamber C extending inwardly toward the car. In its operation it is extremely simple and reliable. When the coupling $T^v$ parts or the hose $T^2$ breaks or bursts, the pressure in the casing A' is suddenly reduced to atmospheric and the valve is closed, due to the pressure contained in the chamber C. However, there is an immediate release of this pressure in the chamber C, as the port $H^2$ allows a gradual escape to atmospheric pressure and necessitating a corresponding gradual application of the air-brakes.

It is to be noted that no legitimate operation of the air-brakes can in any way impair or disturb the valve, it always remaining in the normal open position.

What I claim as my invention is—

1. In an automatic air-brake controller, a cylindrical casing having threaded ends and an intermediate contracted portion providing an interior annular shoulder, a valve-seat resting against said shoulder and having a beveled inner face, and a spring-pressed valve having a correspondingly-beveled edge and a by-pass, substantially as described.

2. In an automatic air-brake controller, a substantially cylindrical casing having interiorly-threaded ends with an annular shoulder at the base of the threads of each end, a coupling member screwed into each end, a guide or spider clamped by each coupling member against the corresponding shoulder, a normally open, spring-pressed valve within the casing, and a port in said valve, and a valve-spindle extending from each side thereof and guided in said spiders, substantially as described.

3. In an automatic air-brake controller the combination with the main casing, the valve-seat secured therein, the valve, and the port through said valve, of a supplementary casing attached to and continuous with the main casing, as and for the purpose specified.

4. In an automatic air-brake controller the combination with the main casing, containing the valve-seat in the central portion and an outlet at the end thereof, of a supplementary casing attached to the main casing and having an inlet at the extremity, a valve having a port-hole extending therethrough, means for supporting and constraining the motion of the said valve, and convenient means for attaching said controller to the train-pipe, as and for the purpose specified.

5. In an automatic air-brake controller the combination with the main casing containing the valve-seat in the central portion and an outlet at the end thereof, of a supplementary casing, attached to the main casing and containing an inlet at its extremity, a valve having a port-hole extending therethrough, a spindle passing into and through the valve, and extending on either side, spiders forming bearings for said spindle, a shoulder on said spindle designed to limit the valve's outward play, a compression-spring attached to the face of the valve and continuously pressing it from its seat, and means for attaching said controller to the train-pipe, as and for the purpose specified.

6. In an automatic air-brake controller, the combination of a cylindrical casing, having a contracted portion and annular enlarged threaded ends, a chambered member, continuous with and designed to screw into said casing, a threaded opening in the outstanding end of said chamber, a valve, a valve-seat rigidly secured in the cylindrical casing, and resting on the abutment formed, by the contraction in the central portion of the casing, a spindle passing into and through said valve and extending on either side thereof, cap-nuts screwing into the threaded end portions and connecting the controller to the train-pipes, spiders forming bearings for the valve-spindle, resting and secured between the abutments formed by the annular threaded enlargements and the inner faces of the threaded members, approaching and screwed to the said casing, a shoulder forming part of or secured to the valve-spindle, and limiting the valve's outward play, a spiral compression-spring encircling the spindle and abutting at its extremities a spider and the valve-face, and a port-hole located in the said valve, and designed for gradually equalizing the pressures on the opposing faces thereof, when the valve is in its closed position.

THOMAS CLEGG.

Witnesses:
GEO. C. MATHISON,
GERALD S. ROXBURGH.